(12) United States Patent
Si et al.

(10) Patent No.: US 10,448,337 B2
(45) Date of Patent: Oct. 15, 2019

(54) DIGITAL SIGNAL RECEIVER AND METHOD FOR CONTROLLING SIGNAL PROCESSING IN SUCH DIGITAL SIGNAL RECEIVER

(71) Applicants: MONTAGE LZ SEMICONDUCTOR (SHANGHAI) CO., LTD., Shanghai (CN); MONTAGE LZ TECHNOLOGIES (CHENGDU) CO., LTD., Shuangliu District, Chendu OT (CN)

(72) Inventors: Xiaomin Si, Shanghai (CN); Yu Chen, Shanghai (CN); Yuanfei Nie, Shanghai (CN); Zhen Lu, Shanghai (CN); Qinghai Ren, Shanghai (CN); Ruifeng Lu, Shanghai (CN)

(73) Assignees: MONTAGE LZ SEMICONDUCTOR (SHANGHAI) CO., LTD., Shanghai (CN); MONTAGE LZ TECHNOLOGIES (CHENGDU) CO., LTD., Chengdu (CN)

( * ) Notice: Subject to any disclaimer, the term of this patent is extended or adjusted under 35 U.S.C. 154(b) by 78 days.

(21) Appl. No.: 15/466,880

(22) Filed: Mar. 23, 2017

(65) Prior Publication Data
US 2017/0280396 A1 Sep. 28, 2017

(30) Foreign Application Priority Data
Mar. 23, 2016 (CN) .......................... 2016 1 0169852

(51) Int. Cl.
*H04W 52/02* (2009.01)
*H04L 1/00* (2006.01)
*H04L 1/20* (2006.01)

(52) U.S. Cl.
CPC ....... *H04W 52/0261* (2013.01); *H04L 1/0057* (2013.01); *H04L 1/20* (2013.01);
(Continued)

(58) Field of Classification Search
CPC . H04L 1/0057; H04W 52/0261; Y02D 70/00; Y02B 60/50
See application file for complete search history.

(56) References Cited

U.S. PATENT DOCUMENTS

2003/0025957 A1* 2/2003 Jayakumar ............. H04B 10/00
398/5
2005/0213665 A1* 9/2005 Kyusojin ............... H04N 19/63
375/240.25

(Continued)

FOREIGN PATENT DOCUMENTS

CN 102611649 A 7/2012

*Primary Examiner* — Guy J Lamarre
(74) *Attorney, Agent, or Firm* — Jun He Law Offices P.C.; James J. Zhu (57) ABSTRACT

A digital signal receiver comprises an iterative decoder configured to decode its input signal using an iterative decoding algorithm, a signal quality detector, configured to detect signal quality of the input signal of the iterative decoder; a power consumption monitor, configured to detect a parameter indicating power consumption of the iterative decoder; a voltage regulator, configured to adjust a supply voltage of the iterative decoder to maintain it within a preset supply voltage range, based on the detected parameter indicating the power consumption of the iterative decoder; and an iteration controller, configured to adjust a maximum iteration number of decoding based on the signal quality of the input signal of the iterative decoder.

19 Claims, 6 Drawing Sheets

(52) U.S. Cl.
CPC ............ *H04L 1/0051* (2013.01); *Y02D 70/00* (2018.01); *Y02D 70/142* (2018.01); *Y02D 70/168* (2018.01)

(56) References Cited

U.S. PATENT DOCUMENTS

| | | | |
|---|---|---|---|
| 2006/0128324 A1* | 6/2006 | Tan | H03G 3/3042 455/127.1 |
| 2006/0195752 A1* | 8/2006 | Walker | H04L 1/0045 714/748 |
| 2006/0205433 A1* | 9/2006 | Sim | H04B 7/04 455/552.1 |
| 2006/0274861 A1* | 12/2006 | Langenbach | H04L 25/03197 375/341 |
| 2010/0191993 A1* | 7/2010 | Chaudhry | G06F 1/206 713/322 |
| 2012/0146425 A1* | 6/2012 | Lee | H02J 5/005 307/104 |
| 2012/0331314 A1* | 12/2012 | Chaudhry | G06F 1/206 713/300 |
| 2014/0140442 A1* | 5/2014 | Hoogerbrugge | H04R 25/453 375/317 |
| 2015/0326253 A1* | 11/2015 | Bisplinghoff | H03M 13/1111 714/776 |
| 2017/0353964 A1* | 12/2017 | Nusairat | H04L 5/006 |

* cited by examiner

DIGITAL SIGNAL RECEIVER AND METHOD FOR CONTROLLING SIGNAL PROCESSING IN SUCH DIGITAL SIGNAL RECEIVER

CROSS REFERENCE TO RELATED APPLICATIONS

This application claims priority to Chinese Patent Application Number 201610169852.2 filed on Mar. 23, 2016, the entire content of which is incorporated herein by reference.

TECHNICAL FIELD

The present application relates generally to communication technology, and more particularly, to a digital signal receiver and a method for controlling signal processing in such digital signal receiver.

BACKGROUND

In modern communication systems, iterative signal processing technology is often used in receivers. For example, some DVB broadcasting receivers or WiFi transceivers may usually include LDPC decoding modules using iterative decoding algorithms, or further include iterative channel equalizers with iterative processing functionality. When the signal quality of input signals of these modules is relatively bad, several times of iteration may be required for signal processing performed by such modules. However, these modules with iterative processing functionality usually consume a huge amount of power when performing a significant number of iteration for signal processing. In extreme cases, the power may be too high, resulting in excess IR drops from a power regulator to these signal processing modules. Therefore, the modules can not work normally, which may lead to degradation of the receiver performance.

What is more, in mass production of IC chip, the performance of any individual chip may vary due to fluctuation of the condition of the semiconductor production line. Even with exactly same design, some chips may be able to work at a higher speed, while the others may only work at a lower speed. Typically, the faster chips can work properly under a lower supply voltage. However, in order to make sure that the slower chips can also work normally, the supply voltage is often configured higher than the voltage actually needed by the faster chips. In real application, the supply voltage range which appears on a chip's specification (datasheet), is usually given as within a certain percentage of a standardized voltage. The faster chips work under the standardized supply voltage, wasting a lot of power consumption. As a result, the maximum power consumption of an IC product is calculated based on its faster chips. With a known allowed maximum operation temperature of the chip, the maximum power consumption allowed can be calculated based on a device model of the faster chips. Usually an IC product's pinout and its packaging technology are chosen after calculating its maximum power consumption and highest operation temperature. Such calculation usually is not accurate due to the difficulty to accurately predict the power consumption. Therefore, in reality, a lot of margin is usually added.

The maximum allowed power limits the maximum iteration number discussed above. This configuration method can guarantee that the power consumption of all the chips, faster or slow, is lower than an upper limit when the maximum iteration number is executed, so that the chips will not work over temperature due to high power consumption, or the IR drop of the chips will not be too large to cause malfunction.

In order to make sure that the receivers can function properly under a larger IR drop, various methods have been used. One of the methods is to add certain timing margin when designing digital circuits for the receivers. Such margin may keep the system working normally under "the worst condition" (i.e. highest IR drop). Another method is to increase the supply voltage of some circuit modules in the receiver circuits. However, none of these methods can solve the problem of the large power consumption of the receiver system, while adding the margin also increases chip size. A further method is to limit the iteration number, at a smaller value after taking into consideration of the fluctuation of manufacturing process.

SUMMARY

An objective of the present application is to optimize the control of signal processing of circuit modules which uses an iterative signal processing method.

In an aspect of the present application, there is provided method for controlling signal processing in a digital signal receiver, wherein the digital signal receiver comprises one or more iterative signal processing modules, each processing its input signal using an iterative processing algorithm, and the method comprises: detecting, for at least one of the one or more iterative signal processing modules, signal quality of its input signal and a parameter indicating power consumption of the iterative signal processing module; adjusting a supply voltage of the iterative signal processing module to maintain it within a preset supply voltage range, based on the detected parameter indicating the power consumption of the iterative signal processing module; and adjusting a maximum iteration number of signal processing for the iterative signal processing module based on the detected signal quality of its input signal, when the supply voltage of the iterative signal processing module is maintained within the preset supply voltage range.

It can be seen that, the control method of the present application can effectively reduce the system power consumption given that the signal processing ability is predetermined; can also achieve the best signal processing ability for a given power consumption range. Specially, the mass production IC chips may have performance variation. The method of the present application can automatically make adjustment to each chip to keep it working under a proper condition. The supply voltages of the faster chips can be set lower than those of the slower chips, so as to reduce power consumption without impairing signal processing ability. Alternatively, the chips can increase the maximum iteration number of signal processing to improve their signal processing ability while keeping their power consumption within a preset range. Furthermore, all of these adjustments can be done in real time, which improves the flexibility of circuit design and decreases the chip size.

In certain embodiments, the step of adjusting the maximum iteration number further comprises: increasing the maximum iteration number of signal processing for the iterative signal processing module to improve its signal processing performance, or decreasing the maximum iteration number of signal processing for the iterative signal processing module to reduce its power consumption.

In certain embodiments, the parameter indicating the power consumption of the iteration signal processing module comprises at least one of a supply voltage and temperature of the iterative signal processing module.

In certain embodiments, the one or more iterative signal processing modules comprise a forward error correction (FEC) decoder using an iterative processing algorithm, and the detecting step comprises detecting a signal-to-noise ratio (SNR) or bit error rate (BER) of the input signal of the FEC decoder; and wherein the step of adjusting the maximum iteration number of signal processing further comprises adjusting the maximum iteration number of signal processing of the FEC decoder based on the detected SNR or BER of the input signal of the FEC decoder, such that a value of the maximum iteration number of signal processing when the SNR or BER is in a no convergence region is smaller than a value of the max iteration number when the SNR or BER is in a waterfall region or an error floor region.

In certain embodiments, the FEC decoder is a low density parity check (LDPC) decoder, and the iterative processing algorithm used by the LDPC decoder is iterative LDPC decoding algorithm.

In certain embodiments, the FEC decoder is a Turbo code decoder, and the iterative processing algorithm used by the Turbo code decoder is iterative Turbo code decoding algorithm.

In certain embodiments, the detection of the BER is performed after a preset number of times of iteration in iterative processing.

In certain embodiments, the step of adjusting the maximum iteration number of signal processing further comprises: adjusting the maximum iteration number of signal processing of the FEC decoder, such that a value of the maximum iteration number of signal processing when the SNR or BER of the input signal of the FEC decoder is in an error floor region is smaller than a value of the maximum iteration number of signal processing when the SNR or BER of the input signal of the FEC decoder is in a waterfall region.

In certain embodiments, the value of the maximum iteration number of signal processing of the FEC decoder when the SNR or BER of the input signal of the FEC decoder is in the error floor region is 50% to 90% of the value of the maximum iteration number of signal processing of the FEC decoder when the SNR or BER of the input signal of the FEC decoder is in the waterfall region.

In certain embodiments, the method further comprises: decreasing the supply voltage of the FEC decoder and maintaining it within the preset supply voltage range, when the SNR or BER of the input signal of the FEC decoder is in the no convergence region.

In certain embodiments, the one or more iterative signal processing modules comprise a channel equalizer using an iteration processing algorithm, and the detecting step further comprises detecting the SNR of the input signal of the channel equalizer; and the step of adjusting the maximum iteration number of signal processing further comprises: decreasing the maximum iteration number of signal processing of the channel equalizer when the detected SNR of the input signal of the channel equalizer increases; or setting the maximum iteration number of signal processing of the channel equalizer as a high SNR iteration number when the detected SNR of the input signal of the channel equalizer is higher than a preset threshold, and setting the maximum iteration number of signal processing as a low SNR iteration number when the detected SNR of the input signal of the channel equalizer is equal to or lower than the preset threshold, wherein the low SNR iteration number is larger than the high SNR iteration number.

In another aspect of the present application, there is provided a digital signal receiver, comprising: an iterative decoder, configured to decode its input signal using an iterative decoding algorithm; a signal quality detector, configured to detect signal quality of the input signal of the iterative decoder; a power consumption monitor, configured to detect a parameter indicating power consumption of the iterative decoder; a voltage regulator, configured to adjust a supply voltage of the iterative decoder to maintain it within a preset supply voltage range, based on the detected parameter indicating the power consumption of the iterative decoder; and an iteration controller, configured to adjust a maximum iteration number of decoding based on the detected signal quality of the input signal of the iterative decoder.

The foregoing is a brief summary of the present application and is possibly simplified, summarized and detail-omitted. It should be appreciated by those skilled in the art that this part of application is just exemplary, and never intends to limit the scope of this application in any means. This summary part is neither intended to determine the key features or necessary features of the subject matter this application seeking to protect, nor intended to be used as a supplementary means for determining the scope of the subject matter this application seeking to protect.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. With the drawings, the contents of the present application will be illustrated more clearly and detailedly.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the application. It should be understood that, the various aspects of the application described and graphically presented herein may be arranged, replaced, combined, divided and designed in many different configurations, and these different configurations are implicitly included in the application.

Iterative processing algorithm is an algorithm which repeatedly performs the same calculation step or similar calculation steps. Each repetition of the calculation step(s) is called an iteration. Each iteration receives one or more input parameters and outputs a calculation result. The calculation result of an iteration is usually used as the input of a next iteration, so that the calculation result of each iteration is an update to the calculation result of its previous iteration. After many times of iteration, the calculation result can be updated repeatedly and can get closer to or reach an optimal value or expectation step by step.

The iterative algorithm is widely used in signal and data processing. However, although the iterative algorithm can improve the processing performance, repeated performance of the same calculation step makes the calculation complexity and time increase significantly with the increase of iteration number.

With the increase of hardware processing speed, receivers in modern communication systems usually use iterative signal processing module to improve their receiving performance. The iterative signal processing modules use the iterative processing algorithm to process their input signals. To satisfy the requirement on processing time by the communication systems, especially under some conditions which has high requirement on real-time performance, the clock frequency of the iterative signal processing module is usually much higher than those modules which do not use the iterative processing algorithm, thereby to shorten the time for iterative calculation. Nevertheless, the increase of clock frequency significantly increases power consumption of the iterative signal processing modules.

The inventors of the present application have found that, in most cases, although the iterative signal processing algorithm may improve signal processing performance, the increased number of iteration does not necessarily result in a significant improvement in the signal processing performance when the number of iteration is relatively big. Besides, for signals with different signal quality, each iteration does not contribute to an equal improvement of the signal processing performance. For example, when the signal quality is very bad, the improvement resulted from iteration may be subtle, and excess number of iteration probably cannot significantly improve the system performance. When the signal quality is very good, only a few number of iteration can satisfy the requirement on signal processing performance, and thus excess number of iteration probably cannot significantly improve the system performance either. On the contrary, when the signal quality is neither too good nor too bad, repetitive iteration can usually improve the system performance significantly.

Figure 1:
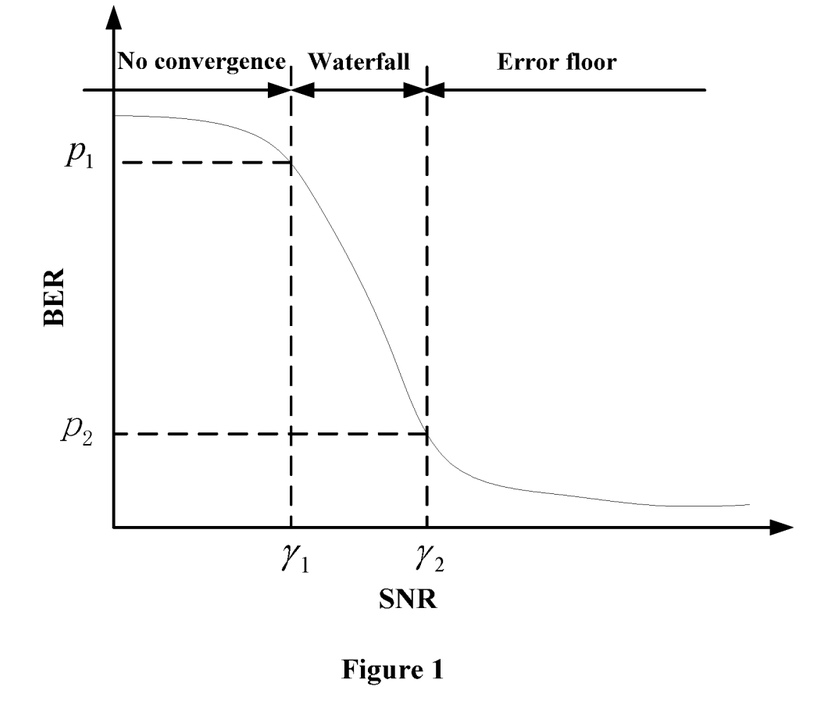
FIG. 1 is a graph illustrating how Bit Error Ratio (BER) varies with Signal to Noise Ratio (SNR).

Decoding processing is a typical signal processing. The BER of signals generated by decoding processing is significantly related to the SNR of original signals (i.e. input signals of the decoding processing modules). FIG. 1 illustrates how the BER of a decoded signal varies with the SNR of an input signal. The curve reflects a relationship between the decoding performance and the SNR of the input signal under an ideal condition.

As illustrated in FIG. 1, in terms of the SNR of the input signal, the BER-to-SNR plot can be divided into three regions, i.e. a no convergence region, a waterfall region and an error floor region, wherein the BER is for the decoded signal. The three regions of the BER vs. SNR curve correspond to three different input signal quality regions, respectively. In the no convergence region (SNR<$\gamma_1$ or BER>$p_1$), the BER of the decoded bits is very high, and it does not change significantly with the increase of the SNR of the input signal. In the waterfall region ($\gamma_1$<SNR<$\gamma_2$ or $p_2$<BER<$p_1$), the BER decreases significantly with the increase of the SNR. In the error floor region (SNR>$\gamma_2$ or BER<$p_2$), the BER is very small, and it does not change significantly with the increase of the SNR.

Channel estimation and channel equalization is another type of signal processing, whose performance is also closely related to the signal quality of input signals. As to signal estimation, its performance is generally represented by a mean square error (MSE) of the estimated channel; and as to channel equalization, its performance is generally represented by a MSE of the equalized signal. Because channel equalization is usually based on the result of channel estimation, these processing can be considered together, and the MSE of the equalized signal can be used to measure the signal quality after channel estimation and equalization. The smaller the MSE is, the better the performance is. Under normal conditions, the MSE decreases with the increase of the SNR of the input signal. However, as to channel estimation and channel equalization, a curve indicative of a relationship between the MSE and the SNR is different from the BER vs. SNR curve illustrated in FIG. 1. The MSE vs. SNR curve usually does not have the steep waterfall region.

The inventors further find that, the receiver system has different requirements on its iterative signal processing module(s) when the signal quality of the input signal changes. For example, when the signal quality of the input signal is very bad, too many times of iteration may not improve the performance of the system, but may significantly increase the system power consumption. Therefore, it is preferred if the signal processing system could adjust the signal processing of these iterative signal processing module based on the quality of the input signal, especially by adjusting the iteration number. In this way, the power consumption of the system can be reduced. Based on the foregoing findings, the inventors conceive a method and apparatus for controlling signal processing in the iterative processing modules.

Figure 2:
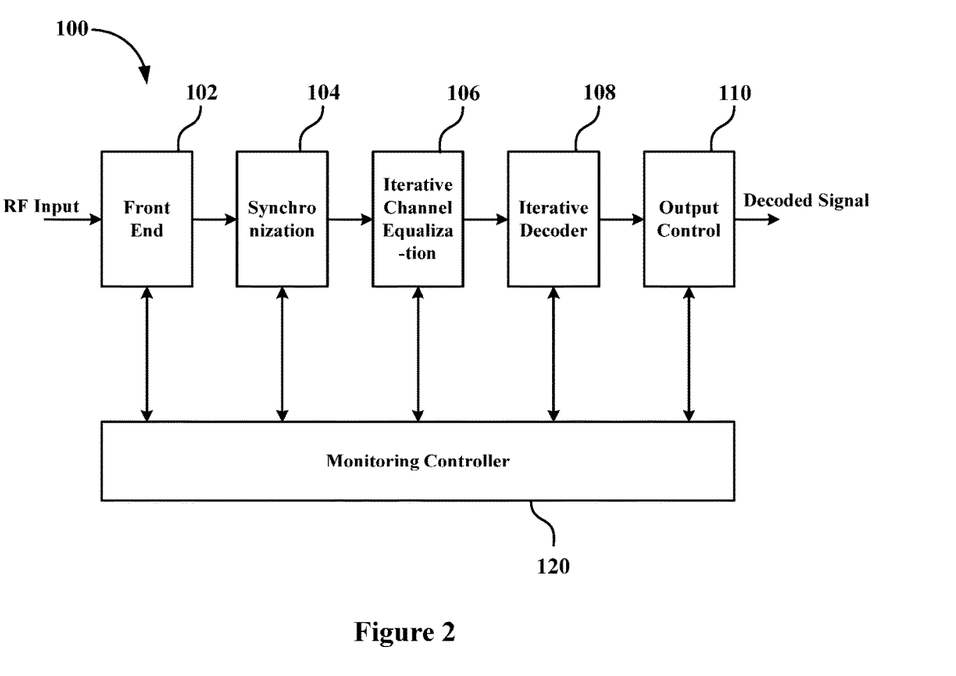
FIG. 2 is a structural diagram of a digital signal receiver 100 according to an embodiment of the present application.

FIG. 2 illustrates a scheme of a digital signal receiver 100 according to an embodiment of the present application.

As shown in FIG. 2, the digital signal receiver 100 includes a front end module 102, a synchronization module 104, an iterative channel equalization module 106, an iterative decoder 108, an output controller 110 and other signal processing modules (not shown). These signal processing modules are connected in series forming a signal processing chain which is used to transform a radio-frequency input signal received by the digital signal receiver 100 to a decoded output signal for post-stage circuit modules.

Specifically, the front end module 102 converts the radio-frequency input signal into a digital signal. The synchronization module 104 receives the digital signal from the front end module 102 and performs signal synchronization to the digital signal. The iterative channel equalization 106 performs channel estimation and channel equalization to the synchronized digital signal using an iterative equalization algorithm. The iterative decoder 108 decodes the equalized signal using an iterative decoding algorithm, such as an iterative Forward Error Correction (FEC) algorithm. The output controller 110 is used to control the output of the decoded signal.

Moreover, the digital signal receiver 100 also includes a monitoring controller 120 to monitor and control the processing performed in the above modules. For example, the monitoring controller 120 can control the iterative processing in the iterative channel equalizer 106 and/or the iterative decoder 108.

Note that in communication systems, data are usually transmitted in form of "data frame". An encoder of a transmitter encodes data and generates one or more code blocks, and then distributes the code blocks into one or more data frames. Each data frame is modulated and transmitted. Accordingly, the receiver receives each data frame, collects the code blocks and performs decoding to the code blocks. Therefore, the synchronization module 104 in the digital signal receiver 100 illustrated in FIG. 2 has data frame synchronization function to identify the data frames separately. The iterative channel equalizer 106 equalizes each data frame, and the iterative decoder 108 collects data of the one or more data frames, which is decoded until at least one complete code block has been received. Thus, it will be understood that the iterative channel equalizer 104 and the iterative decoder 106 in the digital signal receiver 100 illustrated in FIG. 2 processes a data block each time, which corresponds to one or more data frames.

The iterative channel equalizer 106 includes a channel estimation module and an equalization module (not shown). During every iteration, the channel estimation module uses known information to estimate a channel response based on the signal received. The equalization module uses the estimated channel response to equalize the signal received to eliminate the effects of the channels and obtain the equalized signal. In the next iteration, the channel estimation module uses the signal after the last equalization as known information to update the estimated channel response to obtain an updated channel response. After that, the equalization module further uses the updated channel response to equalize the signal received thereby to obtain an updated equalized signal. Generally, the more times of iteration would result in better signal quality of the final equalized signal. The iterative channel equalizer 106 can repeat the above processing until the equalized signal after repetitive iteration processing reaches preset performance, for example, reach a preset SNR, or until the iteration processing reaches a preset number times of iteration.

For the radio-frequency input signals in different forms, the iterative channel equalizer 106 can use different algorithms and structures. For example, as to single-carrier signals, the equalization module can be Decision Feedback Equalizer (DFE). As to multi-carrier signals, the received signals can first be dissolved into a series of subcarriers, and each subcarrier's channel is a flat fading channel. Then any equalization algorithm for flat fading channels can be used to equalize the signal, for example the Zero Forcing (ZF) algorithm, the Minimum Means Square Error (MMSE) algorithm and so on.

As mentioned above, the performance of the iterative channel equalizer 106 decreases when the SNR of the input signal of the equalizer 106 increases. In other words, the higher the SNR of the input signal is, the less the increase in iteration number performed by the iterative channel equalizer 106 affects the equalized signal. Accordingly, the monitoring controller 120 can dynamically adjust the iteration number of the corresponding iterative processing based on the signal quality of the input signal of the iterative signal processing module. It should be understood that in certain embodiments, the respective iteration numbers for multiple iterative signal processing modules can be adjusted, for example adjusting the respective iteration numbers of the channel equalizer 106 and the decoder 108 simultaneously. However, in some other embodiments, only the iteration numbers for a portion of the multiple iterative signal processing modules can be adjusted, e.g. only the iteration number for the channel equalizer 106 or the decoder 108.

Figure 3:
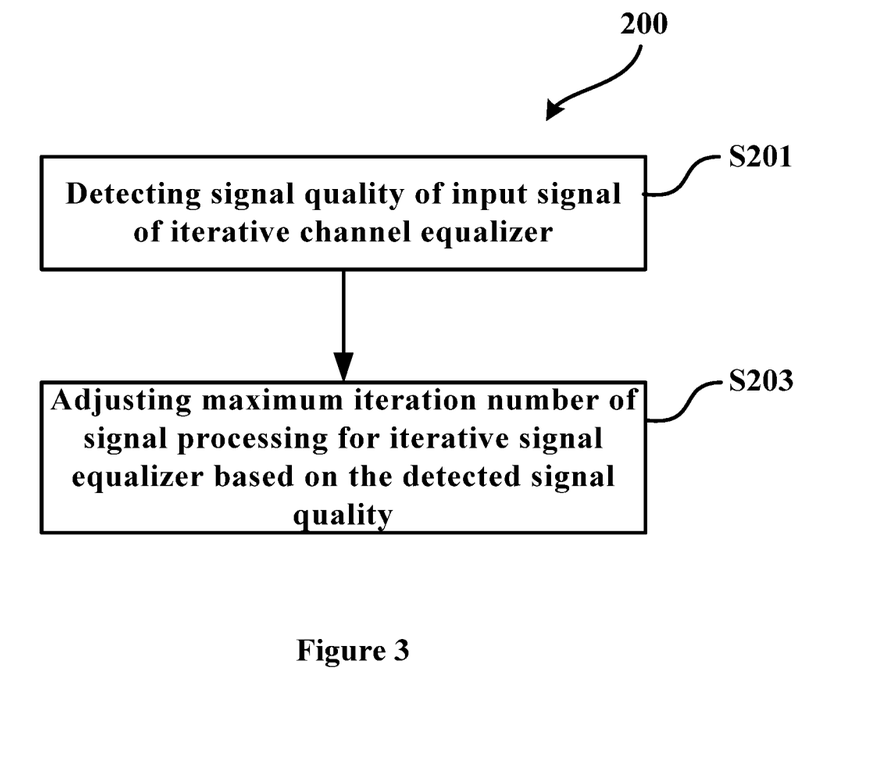
FIG. 3 illustrates a method 200 for controlling signal processing in a digital signal receiver according to an embodiment of the present application.

FIG. 3 illustrates a method 200 for controlling signal processing in a digital signal receivers according to an embodiment of the present application. The method 200 can be applied in the digital signal receiver 100 illustrated in FIG. 2. For example, the iterative channel equalizer 106 and the monitoring controller 120 can implement the method 200.

As illustrated in FIG. 3, the control method 200 includes the following steps:

In step S201, signal quality of an input signal of an iterative channel equalizer is detected.

In practice, the signal quality of input signals is usually measured with the SNR. The SNR is a ratio of a desired signal power and a noise signal power in the received signal. The higher the SNR, the better the signal quality is. Otherwise, the signal quality is worse. A person skilled in the art understands that in prior art, there are a lot of methods to estimate the SNR. The module for detecting and estimating the SNR of the input signal of the signal equalizer can be an individual module or be integrated in the channel equalizer or monitoring controller.

In step S203, based on the detected signal quality of the input signal, the maximum iteration number of signal processing of the iterative channel equalizer is adjusted.

In certain embodiments, the detected signal quality of the input signal in step S201 is the SNR. Accordingly, step 203 can include: decreasing the maximum iteration number of signal processing when the SNR of the detected input signal increases. For example, a preset threshold can be set, and the input signals with a SNR lower than the threshold is determined as having a low quality; otherwise, the signal is determined as having a high quality. Accordingly, when the detected SNR of the input signal is higher than the preset threshold, the iteration number of the iterative channel equalizer can be set as a high SNR iteration number; while when the detected SNR of the input signal is lower than the preset threshold, the iteration number can be set as a low SNR iteration number, wherein the low SNR iteration number is greater than the high SNR iteration number. In certain embodiments, according to the specific applications, multiple different preset thresholds can be provided to set the iteration number as multiple different values based on different SNRs. In certain embodiments, the maximum iteration number can also be adjusted relative to the current value of the maximum iteration number. For example, when the detected input signal's SNR is lower than the preset threshold, the iteration number can be set as a preset value smaller than the current iteration number or a preset ratio of the current iteration number. Moreover, when the detected input signal's SNR is higher than the preset threshold, the iteration number can be a preset value larger than the current iteration number or a preset ratio of the current iteration number. It can be understood that the preset threshold can be adjusted according to the real needs of circuit operation.

It should be noted that, in certain embodiments, the adjustment or configuration of the maximum iteration numbers in step S203 is usually not used to adjust the iteration number of the data blocks being processed, but used in the processing of subsequently received data blocks. Of course, in some other embodiments, it can be used to adjust the iteration number of data blocks being processed. Besides, the maximum iteration number of the iterative signal processing module is the largest iteration number a module is allowed to perform on the same data block during the iterative processing. However, it does not mean that the module needs to complete the maximum iteration number of iteration in every operation. In the processing performed by the module, when other preset conditions are met, for example when an error occurs, or the output signal satisfies a required performance, the iterative processing can also end in advance.

It can be seen that, when the signal quality of the input signal is relatively good, the iteration number actually performed by the iterative channel equalizer can be set at a smaller number. In this way, the power consumption and processing time of the channel equalizer can be reduced, without impairing the performance of the channel equalization significantly. On the contrary, when the signal quality of the input signal is relatively bad, the iteration number can be set at a larger number to improve the performance of the channel equalization. This adaptive adjustment of iterative processing comprehensively considers power consumption and processing performance.

Moreover, in certain embodiments, the method 200 also includes detecting at least one parameter indicating the power consumption of the iterative channel equalizer, such as supply voltage, temperature, etc. With these parameters, the system can determine the power consumption condition of the iterative channel equalizer. Then, it can adjust the supply voltage of the iterative channel equalizer to maintain the supply voltage within a preset supply voltage range, based on the detected parameters indicating the power consumption. For example, the preset supply voltage range is a voltage range allowing normal operation of the iterative channel equalizer, which usually includes an upper voltage limit and a lower voltage limit. Thus, the iterative channel equalizer can work normally.

Still referring to FIG. 2, the iterative decoder 108 of the digital signal receiver 100 can also adopt an iterative processing algorithm to perform decoding processing. For example, a Low Density Parity Check (LDPC) code decoder, a Turbo code decoder and a Repeat Accumulate (RA) code decoder can be used, which all use the iterative decoding algorithm for decoding. Besides, as illustrated in FIG. 1, the signal quality of the input signal received by the iterative decoder 108 can affect the decoding performance. Specifically, when the detected SNR or BER of the input signal is in the no convergence region, i.e. the signal quality is very bad, repetitive iteration can not improve the decoding performance significantly. When the SNR or BER is in the waterfall region, the signal quality is intermediate, and repetitive iteration can significantly improve the decoding performance. When the SNR or BER falls in the error floor region, i.e. the signal quality is relatively good, the decoding performance cannot be improved after several times of iteration.

Figure 4:
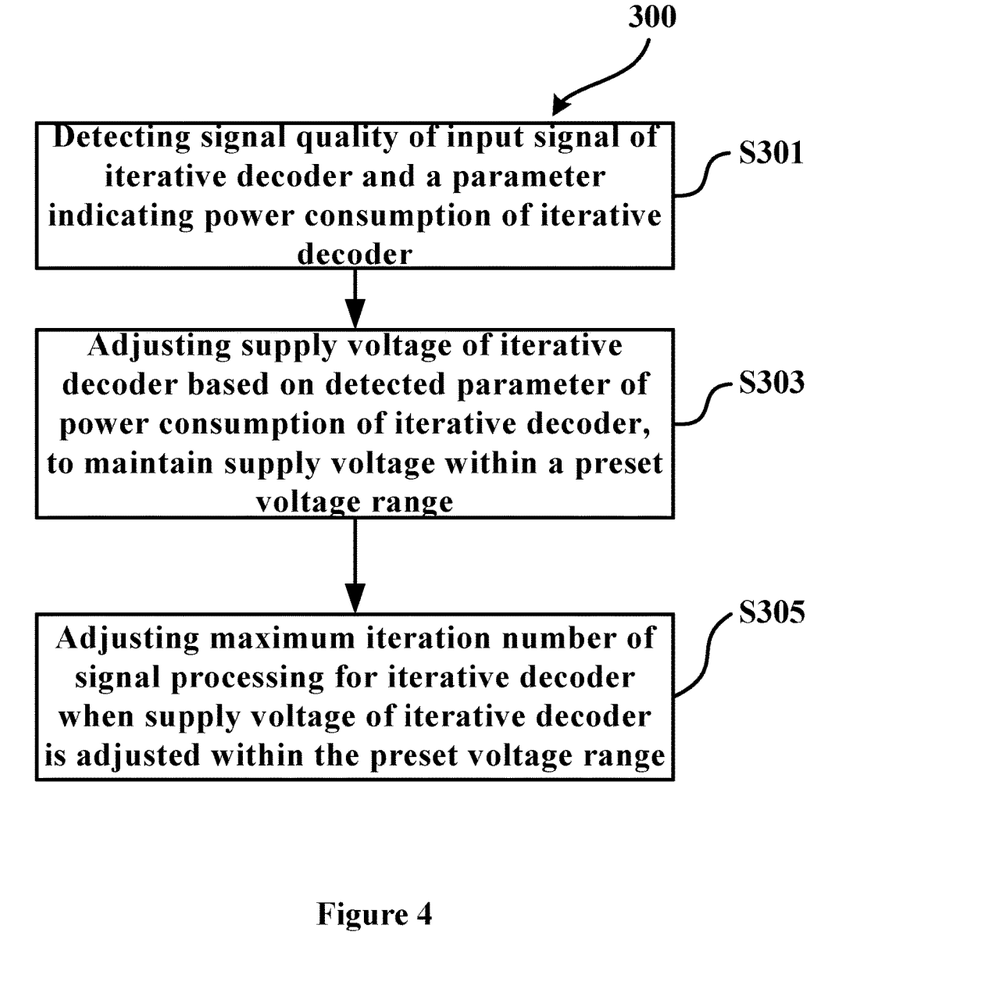
FIG. 4 illustrates a method 300 for controlling signal processing in a digital signal receiver according to an embodiment of the present application.

FIG. 4 illustrates a method 300 for controlling signal processing in a digital signal receiver according to an embodiment of the present application. The method 300 can be applied in the digital signal receiver 100 illustrated in FIG. 2. For example, the iterative decoder 108 and the monitoring controller 120 can implement the control method 300.

As illustrated in FIG. 4, in step S301, signal quality of an input signal of an iterative decoder is detected, and a parameter indicating power consumption of the iterative decoder is detected as well.

The detected signal quality of the input signal can be either SNR or BER. As to a decoding module, besides SNR, the signal quality of its input signal can also be represented by the BER. The BER is a ratio of the number of error bits and the number of all data bits in the decoded bits output from the decoding module. When the encoding method is predetermined, there is certain relationship between the SNR and the BER. Therefore, the BER can also reflect the signal quality of the input signal to some extent. The higher the BER is, the worse is the signal quality. The lower the BER is, the better the signal quality is. Note that as to data transmitted in form of data blocks, a parameter, Block Error Rate (error ratio of the data blocks after decoding processing), is usually used to measure the signal quality. As the bit error rate and block error rate are parameters with similar physical properties, for purpose of simplicity, only the bit error rate is used hereinafter as an example. The person skilled in the art can understand that the description of bit error rate can also be used for block error rate.

Besides detecting the signal quality of the iterative decoder, in step S301, the parameter indicating the power consumption of the decoder, for example, the supply voltage, temperature or other similar parameters or information of the iterative decoder, is also detected. These parameters indicating power consumption of the decoder can reflect the power consumption condition of the decoder and can further be used to determine the working condition of the decoder. For example, when the power consumption of the iterative decoder is abnormal, such as that the supply voltage is relatively low, some components (such as flip-flop components) inside the decoder may not work properly, thus increasing the noises. Therefore, the decoder may need to increase the maximum iteration number to satisfy the performance requirement on decoding processing, which in return increases a working current needed by the decoder (the larger the iteration number is, the larger the working current is required), and further decreases the supply voltage available for the decoder. Therefore, in certain embodiments, the iteration number of signal processing of the iterative decoder can be adjusted based on the power consumption condition of the decoder, so as to avoid such positive feedback. Similarly, when the power consumption of the decoder is too high, the iteration number can be prevented from further increasing based on the detected power consumption. Hereinafter, the application is elaborated by taking the supply voltage as an example of the parameter indicating the power consumption of the decoder, which should not limit to scope of the present application.

It should be noted that the decoding performance depends on the iteration number, while the bits used to estimate the BER are the decoded bits. Therefore, when using the BER to measure the signal quality, it is preferred to detect the BER after a predetermined number of times of iteration in step S301.

In step S303, the supply voltage of the iterative decoder is adjusted based on the detected parameter indicating the power consumption of the iterative decoder, to maintain it within the preset supply voltage range.

The preset supply voltage range is a range that allows normal operation of the iterative decoder, which usually includes an upper voltage limit and a lower voltage limit. When the system detects the parameter indicating power consumption and finds it too low, for example, when the detected supply voltage is lower than the lower voltage limit, then the supply voltage can be increased to make the supply voltage of the iterative decoder higher than the lower voltage limit. Similarly, when the system detects that the supply voltage and finds it higher than the high limit, then the supply voltage can be decreased to make the supply voltage of the iterative decoder lower than the upper voltage limit.

Next, in step S305, a maximum iteration number of signal processing for the iterative decoder is adjusted based on the detected signal quality of the input signal, so as to keep the supply voltage of the iterative decoder within the preset supply voltage range.

In certain embodiments, the steps of adjusting the maximum iteration number includes adjusting the maximum iteration number based on the detected signal quality of the input signal such that a value of the max iteration number of signal processing when the SNR or BER is in the no convergence region is smaller than a value of the maximum iteration number when the SNR or BER is in the waterfall region or the error floor region. Furthermore, the value of the max iteration number of signal processing when the SNR or BER is in the error floor region can be smaller than the value of the max iteration number when the SNR or BER is in the waterfall region. It should be noted that the system adjusts the iteration number based on the detected signal quality of the input signals only when the detected supply voltage is higher than the lower voltage limit and lower than the upper voltage limit. In certain embodiments, when the detected supply voltage is lower than the preset lower voltage limit, the maximum iteration number of signal processing in the signal decoder can be decreased. Thus, when the supply voltage is relatively low, the system can reduce power consumption by decreasing the iteration number, so as to avoid that the iteration number increases too much to affect the normal operation of the decoder.

Hereinafter, the method 300 shown in FIG. 4 is elaborated with reference to the iteration decoder 108 of the digital signal receiver 100 illustrated in FIG. 2.

Based on the detected SNRs of the input signal and the supply voltage conditions, the working condition of the receiver can be classified into several types of conditions. Table 1 provides the exemplary working condition table of the iterative decoder.

TABLE 1

|  | SNR < $\gamma_{convergence}$ | $\gamma_{convergence}$ < SNR < $\gamma_{error\ floor}$ | $\gamma_{error\ floor}$ < SNR |
|---|---|---|---|
| $V_{supply} \leq V_l$ | $A_{11}$ | $A_{12}$ | $A_{13}$ |
| $V_l < V_{supply} < V_h$ | $A_{21}$ | $A_{22}$ | $A_{23}$ |
| $V_{supply} \geq V_h$ | $A_{31}$ | $A_{32}$ | $A_{33}$ |

In Table 1, based on the different combination of the detected supply voltage $V_{supply}$ and the signal quality of the input signal, the working conditions of the iterative decoders can be divided to nine types. Among them, when the supply voltage $V_{supply}$ is smaller than or equal to the preset lower voltage limit $V_l$, the decoder is determined to be in working conditions $A_{11}$, $A_{12}$ or $A_{13}$. When the supply voltage $V_{supply}$ is larger or equal to the preset upper voltage limit $V_h$, the decoder is determined to be in working conditions $A_{31}$, $A_{32}$ or $A_{33}$. These six working conditions can all be regarded as abnormal working conditions which indicate abnormal operation of the iterative decoder, and the iterative decoder may produce decoding errors or other kinds of mis-operation under such conditions. It can be understood that the normal voltage range of the supply power of the iterative decoder is usually based on the decoder's own circuit characteristics. When the iterative decoder is working in the abnormal conditions, the system needs to provide a voltage adjustment signal to adjust the supply voltage of the decoder to the preset normal working range [$V_l$, $V_h$]. In another word, when the decoder is in the working conditions $A_{11}$, $A_{12}$ or $A_{13}$, it is desired to increase its supply voltage; and when the decoder is in the working conditions $A_{31}$, $A_{32}$, $A_{33}$, it is desired to decrease its supply voltage. Besides, when the decoder is in the working conditions $A_{11}$, $A_{12}$ and $A_{13}$, the iteration number of signal processing for the decoder can be decreased, to avoid that the iteration number increases too much to trigger positive feedback (this may further increase the power consumption).

When the detected supply voltage of the decoder satisfies the relationship $V_l < V_{supply} < V_h$, the power condition can be determined as normal. At this time, according to the signal quality of the input signal, the working conditions of the decoder can be further divided into three types, i.e. $A_{21}$, $A_{22}$ and $A_{23}$. Specifically, as illustrated in Table 1, the SNR represents the detected SNR of the input signal of the decoder, $\gamma_{convergence}$ and $\gamma_{error\ floor}$ represent the preset thresholds of the SNR, respectively. When SNR<$\gamma_{convergence}$, the SNR of the input signal is in the no convergence region, and the working condition of the iterative decoder can be set as $A_{21}$. When $\gamma_{convergence}$<SNR<$\gamma_{error\ floor}$, the SNR of the input signal is in the waterfall region, and the working condition of the iterative decoder can be set as $A_{22}$. When $\gamma_{error\ floor}$<SNR, the SNR of the input signal is in the error floor region, and the working condition of the iterative decoder can be set as $A_{23}$.

When the iterative decoders are in the working conditions $A_{21}$, $A_{22}$ and $A_{23}$, the adjustments to the iteration number are listed in Table 2.

TABLE 2

| Working Conditions | Adjustments |
|---|---|
| $A_{21}$ | Setting the maximum iteration number as $I_1$ or reducing the maximum iteration number |
| $A_{22}$ | Setting the maximum iteration number as $I_2$ |
| $A_{23}$ | Setting the maximum iteration number as $I_3$ |
| $A_{11}$, $A_{12}$, $A_{13}$ | Increasing the supply voltage |
| $A_{31}$, $A_{32}$, $A_{33}$ | Decreasing the supply voltage |

In Table 2, $I_1$, $I_2$ and $I_3$ correspond to the values of the maximum iteration number of signal processing when the iterative decoder is working in conditions $A_{21}$, $A_{22}$ and $A_{23}$, respectively, wherein $I_1<I_3$, $I_1<I_2$. Furthermore, it can be set that $I_2>I_3$. In certain embodiments, $I_3$ can be set as ½ of $I_2$.

Specifically, when the working condition is $A_{21}$, the system can set the value of the maximum iteration number to $I_1$, which can be a very small iteration number that is determined according to the actual circuit characteristics. Optionally, the system can also gradually adjust the value of the maximum iteration number, i.e. gradually decreasing the value of the maximum iteration number. For example, when the SNR of the input signal detected at a first time is in the no convergence region, the system can decrease the value of the maximum iteration number by a preset numerical value or by a preset ratio such as 50% to 90% (relative to the present value of the maximum iteration number), preferably reduced to a half of the present value of the maximum iteration number. Moreover, when the SNR of the input signal detected at a second time is still in the no convergence region, the maximum iteration number can be further decreased by a preset numerical value or by a preset ratio. In certain embodiments, when the working condition is $A_{21}$ and the value of the maximum iteration number has been set to or decreased to the minimum available value, then the supply voltage $V_{supply}$ of the iteration decoder can be adjusted, for example, set to or reduced to the lower voltage limit $V_1$. Alternatively, the supply voltage $V_{supply}$ can be adjusted simultaneously with the adjusting of the maximum iteration number.

In certain embodiments, when the detected SNR or BER of the input signal is in the no convergence region, the system can decrease the supply voltage of the iterative decoder, and maintain it within a preset supply voltage range. For example, the supply voltage can be decreased to equal to or close to the lower voltage limit, which helps to reduce the power consumption of the iterative decoder.

After the above adjustment, the supply voltage of the iterative decoder can adjusted within the normal working range to prevent its components from mis-function due to low voltage. Besides, the iterative decoder can adaptively adjust its iteration number based on the signal quality of the input signal to reduce the power consumption without impairing the decoding performance.

In actual practice, it is generally required to maintain the power consumption of the iterative decoder within certain power consumption range. Accordingly, when such requirement is satisfied, the maximum iteration number of the iterative decoder can be increased to improve its signal processing ability. For example, when the SNR or BER of the input signal is in the waterfall region, the maximum iteration number can be set as large as possible (but the supply voltage of the iterative decoder should be within the preset supply voltage range), so that the iterative decoder can possess the best signal processing ability. In a word, the control method of the present application can not only reduce the system power consumption given that the signal processing ability is predetermined, but also achieve best signal processing ability within a desired power consumption range.

It should be noted that, the embodiments illustrated in FIG. 3 and FIG. 4 use the iterative channel equalizer and iterative decoder as examples to explain the methods for controlling signal processing in the digital signal receiver according to the present application. However, the person skilled in the art can understand, the control methods of the present application can also be applied to other circuits and modules which use iterative processing algorithm to process signals, and the control methods can also control multiple iterative signal processing modules at the same time.

It should be further noted that in Table 1, the working conditions of the iteration decoder are distinguished by two threshold values of the SNR of the input signal, i.e. $\gamma_{convergence}$ and $\gamma_{error\ floor}$ along with the voltage limits. It can be understood that in actual applications, the system can set more (for example 3, 4, or more) thresholds of the SNR to distinguish different conditions of the input signal (signal quality) for the iterative decoder or other iterative signal processing modules, such that these iterative signal processing modules can perform targeted signal processing. For example, an additional failure threshold $\gamma_{failure}$, which is smaller than $\gamma_{convergence}$, can be provided. The failure threshold can be used to identify whether the signal quality of the input signal can make the receiver work normally or not. When the SNR of the input signal is lower than the failure threshold $\gamma_{convergence}$, the receiver and its signal processing module may not be able to process the input signal correctly. Thus, the maximum iteration number can be set as a smallest available number, for example, one, two or other numbers, and at the same time the supply voltage can be set at a smaller voltage to reduce power consumption. When the SNR of the input signal is smaller than $\gamma_{convergence}$ but greater than $\gamma_{failure}$, it is still possible for the receiver and its signal processing module to work normally. Thus, the maximum iteration number can be set as a largest available value, to process the input signal and retrieve information as much as possible. It can be understood that the largest available value of the maximum iteration number can be determined comprehensively based on power consumption and other factors. Similarly, an intermediate threshold between the thresholds and $\gamma_{convergence}$ and $\gamma_{error\ floor}$ can be provided to distinguish different signal quality of the input signal, which will not be elaborated herein.

Figure 5:
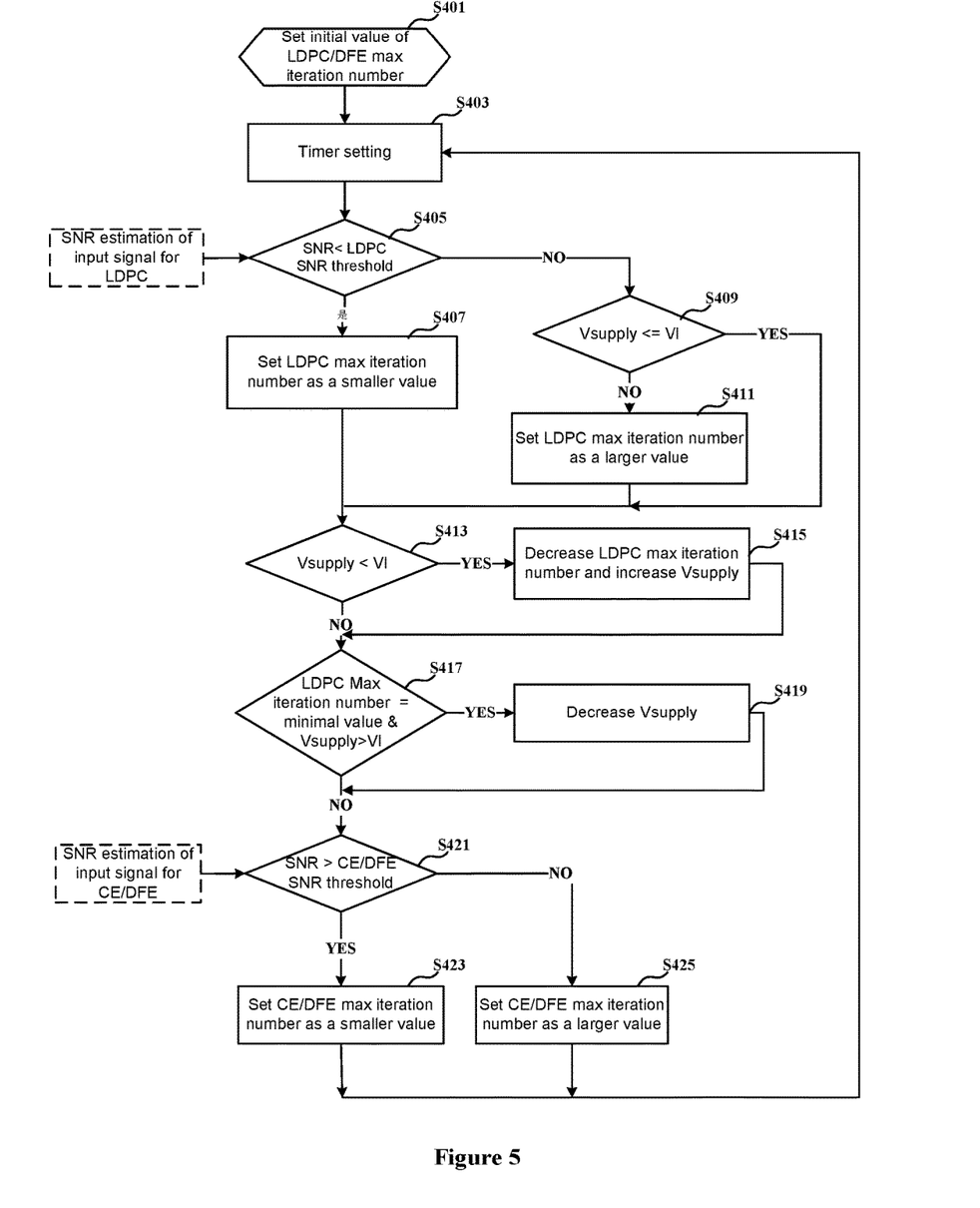
FIG. 5 illustrates an exemplary work flow of the receiver 100 illustrated in FIG. 2 when the method 200 illustrated in FIG. 3 or the method 300 illustrated in FIG. 4 are applied thereto.

FIG. 5 illustrates an exemplary work flow of the receiver 100 illustrated in FIG. 2 when the method 200 illustrated in FIG. 3 or the method 300 illustrated in FIG. 4 are applied thereto.

As shown in FIG. 5, when the receiver 100 is just powered on, information about the signal quality of the input signal and/or power consumption of respective circuit modules may not be available. Thus, in step S401, the digital signal receiver 100 first sets initial values of the maximum iteration number and the minimum iteration number of signal processing for the LDPC decoder and the channel equalizer. Here, the initial value of the maximum iteration number can be set as a largest available iteration number or a bit smaller. Here, the largest available iteration number usually depends on the circuit structure and/or characteristics. A circuit designer can comprehensively consider power consumption, processing time, hardware cost and other aspects, to determine the largest available iteration number. Similarly, the value of the minimum iteration number can also be determined based on the actual condition of the circuit, for example, determined as once, twice or more times.

In step S403, a timer is set. The timer is used to set a time period for adjusting the maximum iteration number of the LDPC decoder, channel equalizer and other iterative signal processing blocks. The period for adjustment can be several data frames, several intervals of time and so on. This can be set according to the actual needs.

In step S405, in order to determine whether the SNR of the input signal of the LDPC decoder is lower than the preset SNR threshold of the LDPC input signals, the preset threshold of the input signal of LDPC decoder can be set as the convergence threshold $\gamma_{convergence}$. When the SNR is lower than the preset threshold of the SNR of the LDPC input signals, the LDPC decoder is in the working condition $A_{21}$, and the process goes to step S407. When the SNR is not lower than the threshold of the SNR of the LDPC input signal, the process goes to step S409.

In step S407, the maximum iteration number of signal processing for the LDPC decoder is set as a smaller number, for example, a half of the largest available iteration number, and then the process goes to step S413.

In step S409, it is determined whether the supply voltage $V_{supply}$ of the LDPC decoder is lower than or equal to the lower voltage limit $V_1$. If it is lower than or equal to the lower voltage limit, it is then determined that the LDPC decoder is in the working conditions $A_{11}$, $A_{12}$ and $A_{13}$, and the process goes to step S413. Otherwise, the process goes to step S411.

In step S411, the maximum iteration number of signal processing for the LDPC decoder is set as a larger number, for example, equal to the largest available iteration number, or a little smaller (e.g. one time smaller than the largest available iteration number) Subsequent to step S411, the process goes to step S413.

In certain embodiments, before step S411, it can be further determined whether the SNR of the input signal of the LDPC decoder is higher than the error floor threshold $\gamma_{error\ floor}$. If the SNR is lower than the threshold, the LDPC decoder can be determined in the working condition $A_{22}$. Otherwise, the LDPC decoder is determined in the working condition $A_{23}$. The value of the maximum iteration number of signal processing for the LDPC decoder in the working condition $A_{22}$ is set to be greater than the value of the maximum iteration number of signal processing for the LDPC decoder in the working condition $A_{23}$. In another word, when the LDPC decoder is in the working condition $A_{23}$, the maximum iteration number of signal processing can be decreased to reduce the power consumption of the LDPC decoder. For example, the value of the max iteration number can be decreased to about a half of the value of the maximum iteration number when the LDPC decoder is in the working condition $A_{22}$.

In step S413, it is further determined whether the supply voltage $V_{supply}$ of the LDPC decoder is lower than the lower voltage limit $V_1$. If the supply voltage $V_{supply}$ is still lower than the lower voltage limit $V_1$, the process goes to step S417; otherwise, the process goes to step S415. It should be noted that step S413 is used to determine how the adjustment of the maximum iteration number affects the supply voltage $V_{supply}$. Therefore, it is not required to perform step S413 immediately after step S407 or step S411. Instead, step S413 can be performed after a preset period has passed since the completion of step S407 or step S411.

In step S415, it is required to decrease the value of the maximum iteration number of signal processing for the LDPC decoder and increase the supply voltage $V_{supply}$ at the same time, because the supply voltage is determined to be too low. Next to step S415, step S417 is performed after a preset period has passed since the completion of step S415. The maximum iteration number at this time is the value of the maximum iteration number determined in step S407 or S411.

Similar to step S413, step S417 is used to determine how the adjustment of the maximum iteration number affects the supply voltage $V_{supply}$. Therefore, step S417 is not performed immediately after the step S415. Instead, the step S417 is performed after a preset period has passed since the completion of step S415.

In step S417, it is further determined whether the maximum iteration number of signal processing for the LDPC decoder is equal to the minimum iteration number, and whether the supply voltage $V_{supply}$ is higher than the lower voltage limit $V_1$. If the maximum iteration number is equal to the minimum iteration number and the supply voltage is higher than the lower voltage limit, which means that the LDPC decoder is in the working condition $A_{21}$, and then the process goes to step S419, the supply voltage $V_{supply}$ is further decreased. But the supply voltage $V_{supply}$ should not be decreased to a voltage lower than the lower voltage limit $V_1$. For example, in step S419, the supply voltage $V_{supply}$ can be decreased gradually for several times. For example, the supply voltage $V_{supply}$ can be decreased at a fixed step. If the value of the maximum iteration number is determined to be equal to the minimum iteration number set in step S401, and the supply voltage $V_{supply}$ is equal to the lower voltage limit $V_1$, then the adjustment to the LDPC decoder stops. In this way, the adjustment to the LDPC decoder is completed.

After the adjustment to the LDPC decoder, the system continues to adjust the iterative processing of the channel equalizer. Specifically, in step S421, it is determined whether the SNR of the input signal of the channel equalizer is lower than a preset input signal SNR threshold of the channel equalizer. If the SNR is lower than the threshold, it means that the signal quality is relatively bad, and the process goes to step S425. If the SNR is higher than the threshold, it means that the signal quality is relatively good, and then the process goes to step S423. The preset SNR threshold is a boundary for determination of the good or bad signal quality, which can be set according to actual needs or the requirement of post-stage circuit modules.

In step S423, the maximum iteration number of signal processing for the channel equalizer is set as a relatively small value. In certain embodiments, the relatively small value can be less than a half of the maximum iteration number. Alternatively, the maximum iteration number can be decreased by a preset value or by a preset ratio, rather than set as a relatively small value, and when the maximum iteration number is reduced to a minimum available value, such reduction can stop.

In step S425, the maximum iteration number of signal processing for the channel equalizer is set as a relatively large value. Here, the relatively large value may the largest available iteration number or a little smaller, or some other value greater than a half of the largest available iteration number. Alternatively, the maximum iteration number can be increased by a preset value or by a preset ratio, rather than set as a relatively large value, and when the maximum iteration number is increased to a largest available iteration number, such increase process can stop.

After the completion of step S423 or step S425, the process goes back to step S403. By performing steps S403 to S425 in such a way for several times, the operation of the digital signal received can be adjusted according to the signal quality and power consumption or power supply condition.

It should be noted that, steps S405 to S419 are steps for adjusting the maximum iteration number of signal processing and the supply voltage for the LDPC decoder; while steps S421 to S425 are steps for adjusting the maximum iteration number of signal processing for the channel equalizer. The two groups of steps are relatively independent, so the receiver can implement the process in an order different from that shown in FIG. 5. For example, in certain embodiments, the adjustment of the maximum iteration numbers of signal processing for the LDPC decoder and the signal equalizer can be performed simultaneously, which can accelerate the system adjustment and response speed.

It can be understood that in certain embodiments, for an iterative signal processing module, the signal quality of its input signals can be determined by detecting the BER or by calculating the channel estimation and the SNR of an output signal of the iterative signal processing module. The person skilled in the art can appreciate these methods for determination of signal quality of the input signal, which will not be described in detail here.

Figure 6:
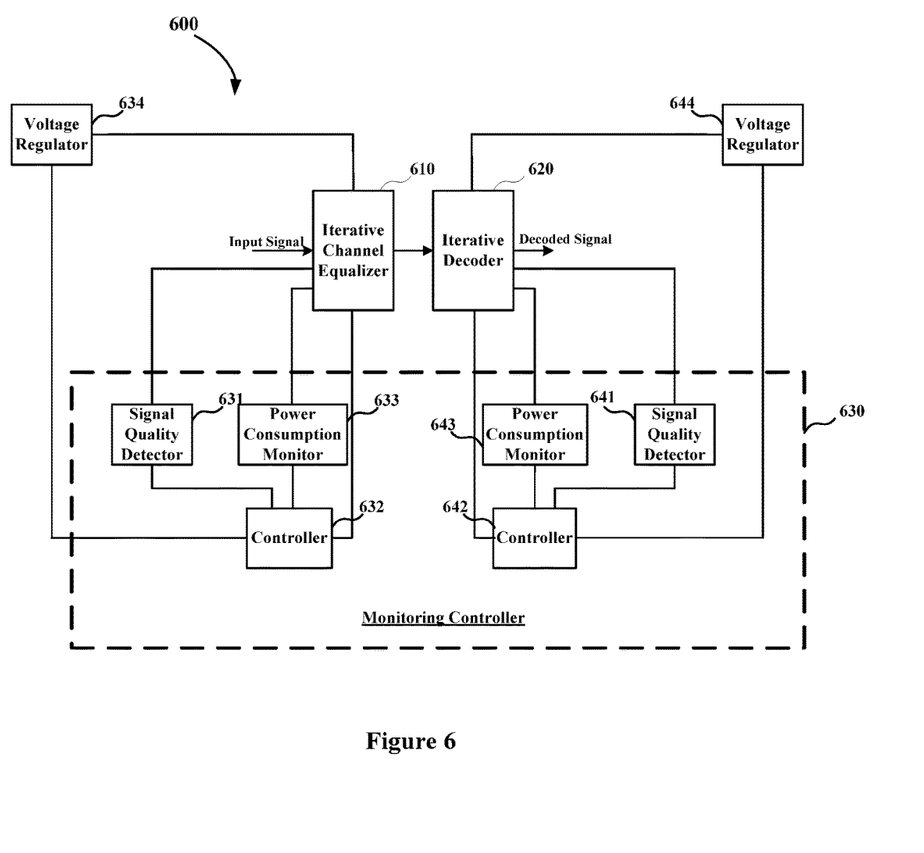
FIG. 6 is a diagram of a digital signal receiver according to an embodiment of the present application.

FIG. 6 illustrates a digital signal receiver 600 according to an embodiment of the present application.

As shown in FIG. 6, the digital signal receiver 600 includes a monitoring controller 630 and several signal processing modules, such as an iterative channel equalizer 610 and an iterative decoder 620. The iterative channel equalizer 610 is used to equalize its input signal using an iterative equalization algorithm and output an equalized signal. The iterative decoder 620 is used to decode the equalized signal using an iterative decoding algorithm and then output a decoded signal.

The monitoring controller 630 is used to monitor and control the operation of various modules of the digital signal receiver 600. The monitoring controller 630 includes signal quality detectors 631 and 641, controllers 632 and 642, power consumption monitors 633 and 643 and voltage regulators 634 and 644. The power consumption monitors 633 and 643 may each have an Analog-to-Digital Converter (ADC) module to collect analog voltages, currents, or similar signals. In certain embodiments, the power consumption monitors 633 and 643 may include temperature sensors or other similar modules to detect other parameters indicating the power consumption of the monitored modules, such as temperature. The signal quality detector 631 is used to detect the signal quality of the input signal of the iterative channel equalizer 610. The "signal quality of the input signal" can be the SNR of the input signal. The power consumption monitor 633 is used to detect a parameter indicating the power consumption of the iterative channel equalizer 610, such as supply voltage, temperature or power consumption.

In certain embodiments, the controller 632 is used to generate a first voltage regulation signal based on the detected parameter indicating the power consumption of the iterative channel equalizer 610; and the voltage regulator 634 is used to regulate the supply voltage of the iterative channel equalizer 610 based on the generated first voltage regulation signal, to maintain the supply voltage within a preset supply voltage range. Given that the supply voltage of the iterative channel equalizer 610 is within the preset supply voltage range, the controller 632 can adjust a maximum iteration number of signal processing for the iterative channel equalizer 610 based on the signal quality of the input signal detected by the signal quality detector 631.

The signal quality detector 641 is used to detect the signal quality of the input signal of the iterative decoder 620. It should be noted that the signal quality of the input signals can be the SNR of the input signal, or other parameters indicating the signal quality of the input signal, such as the BER calculated from the decoded signal output from the decoder and so on. The power consumption monitor 643 is used to detect a parameter indicating the power consumption of the iterative decoder 620, such as its supply voltage, temperature and so on.

In certain embodiments, the controller 642 is used to generate a second voltage regulation signal based on the detected parameter indicating the power consumption of iterative decoder 620, such as the supply voltage; and the voltage regulator 644 can further regulate the supply voltage of the iterative decoder 620 based on the generated second voltage regulation signal, so as to maintain the supply voltage within the preset supply voltage range. It can be understood that the preset supply voltage range for the supply voltage of the iterative decoder 620 can be the same as or different from the preset supply voltage range for the supply voltage of the iterative channel equalizer 610. Given that the supply voltage of the iterative decoder 620 is maintained within the preset supply voltage range, the controller 642 can adjust the maximum iteration number of signal processing for the iterative decoder 620 based on the signal quality of the input signal detected by the signal quality detector 641. For example, the maximum iteration number of signal processing for the iterative decoder 620 can be adjusted to improve signal processing ability, or decrease the maximum iteration number to reduce power consumption, which can be chosen according to actual requirements. In certain embodiments, the supply voltage of the iterative decoder 620 can be decreased to reduce power consumption, when the signal quality is relatively bad, for example when the SNR or BER of the input signal is in the no convergence region. However, the supply voltage of the iterative decoder 620 is generally required to be maintained within a preset supply voltage range, such as equal to or close to a lower voltage limit of the supply voltage.

The specific control method and work flow of signal processing by the digital signal receiver 600 can be referred to the above sections described with reference to FIGS. 2 to 5, which will not be elaborated herein.

It should be noted that in the embodiment illustrated in FIG. 6, the iterative channel equalizer 610 and the iterative decoder 620 is shown as two separate modules, which are powered separately and controlled by different circuit modules. In some alternative embodiments, the iterative channel equalizer can also be integrated with the iterative decoder in a single module powered by the same power source. Accordingly, the power consumption monitors 633 and 634 can be combined together, and the signal quality detectors 631 and 641 can be combined together. Similarly, the controllers 632 and 642 can be combined together, and the voltage regulators 634 and 644 can be combined together. In this way, the combined circuit module can control the iterative signal processing of one or both of the iterative channel equalizer and the iterative decoder, based on the detected power consumption condition and the signal quality of the input signals. Such circuit has a simple structure.

Those skilled in the art may understand and implement other variations to the disclosed embodiments from a study of the drawings, the disclosure, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. A method for controlling signal processing in a digital signal receiver, wherein the digital signal receiver comprises an iterative signal processing module processing its input signal using an iterative processing algorithm and receiving a supply voltage adjustable by a voltage regulator within a preset supply voltage range allowing normal operation of the iterative signal processing module, and the method comprises:
   detecting, for the iterative signal processing module, signal quality of its input signal and a parameter indicating power consumption of the iterative signal processing module;
   adjusting the supply voltage of the iterative signal processing module, based on the detected parameter indicating the power consumption of the iterative signal processing module, so as to maintain the supply voltage within the preset supply voltage range; and
   adjusting a maximum iteration number of signal processing for the iterative signal processing module based on the detected signal quality of its input signal, when the supply voltage of the iterative signal processing module is maintained within the preset supply voltage range.

2. The method according to claim 1, wherein the step of adjusting the maximum iteration number further comprises:
   increasing the maximum iteration number of signal processing for the iterative signal processing module to improve its signal processing performance, or decreasing the maximum iteration number of signal processing for the iterative signal processing module to reduce its power consumption.

3. The method according to claim 1, wherein the parameter indicating the power consumption of the iteration signal processing module comprises at least one of the supply voltage and temperature of the iterative signal processing module.

4. The method according to claim 1, wherein the iterative signal processing is a forward error correction (FEC) decoder using an iterative processing algorithm, and the detecting step comprises detecting a signal-to-noise ratio (SNR) or bit error rate (BER) of the input signal of the FEC decoder as the signal quality of the input signal of the FEC decoder;
and wherein the step of adjusting the maximum iteration number of signal processing further comprises:
adjusting the maximum iteration number of signal processing of the FEC decoder based on the SNR or BER of the input signal of the FEC decoder, such that a value of the maximum iteration number of signal processing when the SNR or BER is in a no convergence region is smaller than a value of the max iteration number when the SNR or BER is in a waterfall region or an error floor region.

5. The method according to claim 4, wherein the FEC decoder is a low density parity check (LDPC) decoder, and the iterative processing algorithm used by the LDPC decoder is iterative LDPC decoding algorithm.

6. The method according to claim 4, wherein the FEC decoder is a Turbo code decoder, and the iterative processing algorithm used by the Turbo code decoder is iterative Turbo code decoding algorithm.

7. The method according to claim 4, wherein when the BER of the input signal of the FEC decoder is detected as the signal quality of the input signal of the FEC decoder, the detection of the BER is performed after a preset number of times of iteration in iterative processing.

8. The method according to claim 4, wherein the method further comprises:
decreasing the supply voltage of the FEC decoder and maintaining it within the preset supply voltage range, when the SNR or BER of the input signal of the FEC decoder is in the no convergence region.

9. The method according to claim 4, wherein the step of adjusting the maximum iteration number of signal processing further comprises:
adjusting the maximum iteration number of signal processing of the FEC decoder, such that a value of the maximum iteration number of signal processing when the SNR or BER of the input signal of the FEC decoder is in an error floor region is smaller than a value of the maximum iteration number of signal processing when the SNR or BER of the input signal of the FEC decoder is in a waterfall region.

10. The method according to claim 9, wherein the value of the maximum iteration number of signal processing of the FEC decoder when the SNR or BER of the input signal of the FEC decoder is in the error floor region is 50% to 90% of the value of the maximum iteration number of signal processing of the FEC decoder when the SNR or BER of the input signal of the FEC decoder is in the waterfall region.

11. The method according to claim 1, wherein the iterative signal processing module is a channel equalizer using an iteration processing algorithm, and the detecting step further comprises detecting a SNR of the input signal of the channel equalizer as the signal quality of the input signal of the channel equalizer;
and the step of adjusting the maximum iteration number of signal processing further comprises:

decreasing the maximum iteration number of signal processing of the channel equalizer when the SNR of the input signal of the channel equalizer increases; or
setting the maximum iteration number of signal processing of the channel equalizer as a high SNR iteration number when the SNR of the input signal of the channel equalizer is higher than a preset threshold, and setting the maximum iteration number of signal processing as a low SNR iteration number when the SNR of the input signal of the channel equalizer is equal to or lower than the preset threshold, wherein the low SNR iteration number is larger than the high SNR iteration number.

12. A digital signal receiver, comprising:
an iterative decoder, configured to decode its input signal using an iterative decoding algorithm;
a signal quality detector, configured to detect signal quality of the input signal of the iterative decoder;
a power consumption monitor, configured to detect a parameter indicating power consumption of the iterative decoder;
a voltage regulator, configured to adjust a supply voltage of the iterative decoder to maintain it within a preset supply voltage range which allows normal operation of the iterative decoder, based on the detected parameter indicating the power consumption of the iterative decoder; and
an iteration controller, configured to adjust a maximum iteration number of decoding based on the signal quality of the input signal of the iterative decoder.

13. The digital signal receiver according to claim 12, wherein the iteration controller is further configured to increase the maximum iteration number of decoding of the iterative decoder to improve its signal processing performance, or decrease the maximum iteration number to reduce its power consumption.

14. The digital signal receiver according to claim 12, wherein the parameter indicating the power consumption of the iteration decoder comprises at least one of the supply voltage and temperature of the iterative decoder.

15. The digital signal receiver according to claim 12, wherein the iterative decoder is a FEC decoder, and the signal quality of the input signal of the FEC decoder comprises a SNR or BER of the input signal of the FEC decoder;
and wherein the iteration controller is further configured to adjust the maximum iteration number of decoding, such that a value of the maximum iteration number of decoding when the SNR or BER of the input signal of the iterative decoder is in a no convergence region is smaller than a value of the maximum iteration number of decoding when the SNR or BER of the input signal of the iterative decoder is in a waterfall region or an error floor region, and the value of the maximum iteration number of decoding when the SNR or BER is in the error floor region is smaller than the value of the maximum iteration number of decoding when the SNR or BER is in the waterfall region.

16. The digital signal receiver according to claim 15, wherein the iterative decoder is a LDPC decoder, and the iterative decoding algorithm used by the LDPC decoder is iterative LDPC decoding algorithm.

17. The digital signal receiver according to claim 15, wherein the iterative decoder is a Turbo decoder, and the iterative decoding algorithm used by the Turbo decoder is iterative Turbo decoding algorithm.

18. The digital signal receiver according to claim 12, wherein the digital signal receiver further comprises:
- an iterative channel equalizer, configured to equalize its input signal using an iterative equalization algorithm;
- and wherein the signal quality detector is further configured to detect signal quality of the input signal of the iterative channel equalizer;
- and wherein the iteration controller is further configured to adjust the maximum iteration number of equalization processing based on the signal quality of the input signal of the iterative channel equalizer.

19. The digital signal receiver according to claim 18, wherein the signal quality detector is configured to detect a SNR of the input signal of the iterative channel equalizer as the signal quality of the input signal of the iterative channel equalizer;
- and wherein the iteration controller is further configured to decrease the maximum iteration number of equalization processing when the SNR of the input signal of the iterative channel equalizer increases.

* * * * *